(12) United States Patent
Dalgic et al.

(10) Patent No.: US 7,451,220 B1
(45) Date of Patent: *Nov. 11, 2008

(54) TECHNIQUES FOR PROVIDING SECURE ACCESS TO A COMMUNICATION SYSTEM

(75) Inventors: Ismail Dalgic, Mountain View, CA (US); Vipin Jain, Santa Clara, CA (US)

(73) Assignee: 3Com Corporation, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/371,213

(22) Filed: Mar. 7, 2006

Related U.S. Application Data

(63) Continuation of application No. 09/639,713, filed on Aug. 14, 2000, now Pat. No. 7,024,478, which is a continuation-in-part of application No. 09/181,431, filed on Oct. 30, 1998, now Pat. No. 6,161,134.

(51) Int. Cl.
*G06F 15/16* (2006.01)
*G06F 15/173* (2006.01)

(52) U.S. Cl. ..................... 709/225; 709/229

(58) Field of Classification Search ................ 709/227, 709/228, 229, 223, 224, 225, 239; 708/109; 370/352
See application file for complete search history.

(56) References Cited

U.S. PATENT DOCUMENTS

| | | | | | |
|---|---|---|---|---|---|
| 5,497,339 | A | * | 3/1996 | Bernard | 708/109 |
| 5,859,959 | A | * | 1/1999 | Kimball et al. | 709/239 |
| 6,466,977 | B1 | * | 10/2002 | Sitaraman et al. | 709/225 |
| 6,775,267 | B1 | * | 8/2004 | Kung et al. | 370/352 |

\* cited by examiner

*Primary Examiner*—Paul H Kang

(57) ABSTRACT

A public telephone and Internet access system that comprises Personal Digital Assistants (PDA) that are connected to an Ethernet or other Local Area Network by a network cradle, and a number of Ethernet telephones connected to the same Local Area Network. The PDAs store encrypted information about their owners, including the owner's name, their phone forwarding preferences, access permissions to the network, and charging/billing information. When a PDA is attached to a network cradle, this information is automatically transferred to the gatekeeper, which is a server that performs management tasks for the Ethernet phone network. These tasks include deciding whether or not a user is allowed to sign up and use a public Ethernet phone, maintaining billing and charging information, and forwarding incoming calls for a given user to the Ethernet phone at the user's current location. This invention provides a secure method for the PDA and the gatekeeper to exchange authentication information.

12 Claims, 3 Drawing Sheets

TECHNIQUES FOR PROVIDING SECURE ACCESS TO A COMMUNICATION SYSTEM

CROSS-REFERENCE TO RELATED APPLICATIONS

This is a Continuation of U.S. patent application Ser. No. 09/639,713 filed Aug. 14, 2000 now U.S. Pat. No. 7,024,478, which is a continuation in part of U.S. patent application Ser. No. 09/181,431 filed Oct. 30, 1998 now U.S. Pat. No. 6,161,134, and are incorporated herein by reference for all purposes. U.S. patent application Ser. No. 08/866,819 filed May 30, 1997, and U.S. patent application Ser. No. 08/955,869 filed Oct. 28, 1997 are also incorporated herein by reference.

BACKGROUND OF THE INVENTION

Recent advances in the manufacture and design of integrated circuits have enabled technology produces to provide portable instruments including palm-sized computers such as the Palm VII from Palm Computing, Inc. Santa Clara, Calif., personal digital assistants (PDAs) and the like. Accessories are available that allow a portable computer to become part of a telecommunications device. One such accessory is described in U.S. Pat. No. 5,606,594, granted to Register et al. on Feb. 25, 1997, entitled "Communication Accessory and Method of Telecommunicating for a PDA." Similarly, U.S. Pat. No. 5,497,339, granted to Bernard et al. on Mar. 5, 1996 provides for a PDA that mounts within a communication device. A prior system describes an information appliance (PDA) and a network appliance (or telephone) that function independently as well as with each other as companion appliances.

In prior art, a communications appliance (digital telephone or Ethernet telephone) is connected directly to the Local Area Network (LAN), and the information appliance (computer or PDA) is connected directly to the communications appliance. That is, the communications appliance is always connected between the LAN and the information appliance (they are connected in series). Both system security means as well as types and method of data transmission are limited by the capabilities of the communications appliance (telephone). This topology limits the application to systems requiring Ethernet telephones or other specially adapted telephones. Thus prior art excludes applications which could possibly incorporate an existing public switched telephone network (PSTRN).

Prior attempts to solve PDA-based number portability and mobility problems, as well as problems of authentication, accounting and billing support for LAN telephones has been based on the use of calling cards, some of which require the user to recall a Personal Identification Number (PIN).

SUMMARY OF THE INVENTION

Accordingly, what is needed is a more generally applicable system that can be used in business or industry without the requirement of special telephones. In the present invention, both the information appliance (computer or PDA) and the communications appliance (an Ethernet telephone) are connected directly to the LAN. A non-Ethernet telephone can be connected directly to the LAN by connecting a Voice over IP Gateway between the telephone and the LAN. This topology obviates the need for specialized telephones and in addition allows the application of any of the various security schemes disclosed in the above cited U.S. patent application Ser. No. 08/866,819 and U.S. patent application Ser. No. 08/955,869. Furthermore, the types and means of data transmission are limited by the information appliance (a computer or PDA) rather than by the telephone.

What is needed yet is a method and system that is economically feasible for use in either private or commercial LAN or Internet systems, whether connected by coaxial cable, by twisted pair wire commonly known as CAT5, by fiber optic cable, by wireless means or by some combination thereof.

What is described is a public telephone and Internet access system that comprises Personal Digital Assistants (PDAs) that are connected to an Ethernet Local Area Network (LAN) by a network cradle, and a number of Ethernet telephones connected to the same LAN. Even though we describe the process in terms of Ethernet LANs, the mechanisms apply to other 802 LANs as well. The PDAs store encrypted information about their owners, including the owner's name, their phone forwarding preference, access permissions to the network, and charging/billing information. When a PDA is attached to a network cradle, this information is automatically transferred to the gate keeper, which is a server that performs management tasks for the Ethernet phone network. These tasks include deciding whether or not a user is allowed to sign up and use a public Ethernet phone, maintaining billing and charging information, and forwarding incoming calls for a given user to the Ethernet phone at the user's current location.

The present invention provides these advantages and others not specifically mentioned above but described in the sections to follow.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

The present invention relates to improvements in network computer environments and has particular applications to the transmission of information between digital devices over a communication medium. More specifically, the present invention relates to the combination of a portable computer with a communication device to form a compound network apparatus used to provide secure and authenticated access to public or private telephone and internet systems. In particular the following detailed description discloses techniques for providing secure access to a communication system.

Networking Devices and Standards

This specification assumes familiarity with the general concepts, protocols and devices currently used in Local Area Networks (LANs) and Wide Area Networks (WANs) such as the IEEE 802.x and ISO 8802 protocol suites and other series of documents released by the Internet Engineering Task Force that are publicly available. For discussion purposes, a generalized topology for a typical LAN (40) is given in FIG. 1. LAN topology refers to the manner in which the hardware elements comprising the network are interconnected. Common topologies for LANs are bus, tree, ring and star. LANs may also have a hybrid topology made up of a combination of these. Overall, the LAN in FIG. 1 has a tree topology, but also incorporated is 72*d* having a bus topology and 70*d* having a star topology. The present invention may be used with any of the above mentioned topologies including a ring topology.

Figure 1:
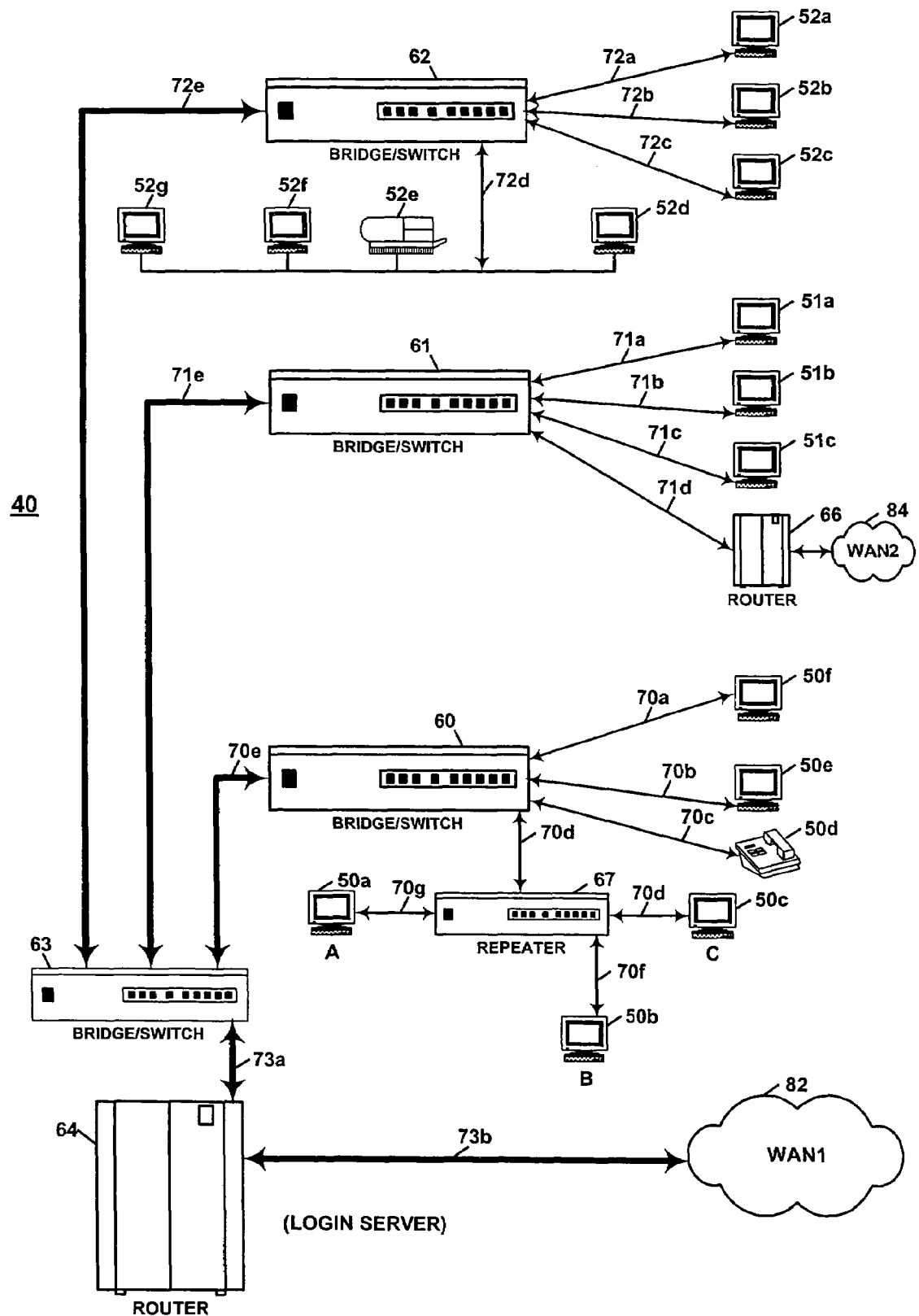
FIG. 1 is a generalized topology for a typical LAN.

The LAN in FIG. 1 represents an arrangement of various hardware and software elements that operate together to allow a number of digital devices to exchange data within the LAN, and also may include Internet connections to external WANs such as WAN 82 and 84. Connection to a Public Switched Telephone Network (PSTN) can be provided by a Voice Over IP Gateway that might be included in WAN2. The typical LAN is comprised of one or more LAN Intermediate Systems (ISs) such as ISs 60-62 and 67 that are responsible for data transmission throughout the LAN and a number of End Systems (ESs) such as ESs 50*a-f*, 51*a-c*, and 52*a-g*, that represent end user equipment. The ESs may be familiar end-user data processing equipment, such as personal computers, Personal Digital Assistants (PDAs), Workstations, printers and additionally other digital devices such as digital telephones or real-time video displays. Different types of ESs can operate together on the same LAN. In the LAN topology of FIG. 1, ISs 50 and 61 are referred to as bridges, WAN ISs 64 and 66 are referred to as routers; and IS 67 is referred to as a repeater. The LAN network topology in FIG. 1 is of a general nature for discussion purposes, and this invention is not limited in application to this topology.

A segment is generally a single interconnected medium such as a coaxial cable, a contiguous wire(s), optical fiber or a particular frequency band. The LAN in FIG. 1 has segments 70*a-g*, 71*a-e*, 72*a-e* and 73*a*. A segment may connect just two devices, such as segment 70*a* (also referred to as a point-to-point or star connection). A segment such as 72*d* may connect a number of devices using a Carrier Sense Multiple Access/Collision Detection (CSMA/CD) protocol or other multiple access protocol such as a token bus or token ring. Signals transmitted on a single segment such as 72*d* are simultaneously hear by all of the ESs and ISs connected to the segment.

A LAN may also contain a number of repeaters, such as repeated 67. A repeater generally physically repeats out of each of its ports all data received on any one port, such that the network behavior perceived by ESs 50*a-c* and the port of IS 60 connected to 67 is identical to the behavior these ports would perceive if they were all connected on the same segment such s 52*d-g* and the corresponding port of 62. Repeaters configured in a star topology such as 67 are also referred to as hub repeaters. The terms hub or star are used in networking to indicate either a switch/bridge layer 2 device, or a repeater layer 1 device. In the FIG. 1 LAN, bridges 61, 62 and 63 have a star or hub configuration as does repeater 67.

Drivers and Adapters

Each of the ISs and ESs in FIG. 1 includes one or more adapters and hardware or software instructions sometime referred to as drivers. An adapter generally includes circuitry and connectors for communication over a segment and translates data from the digital form used by the computer circuitry in the IS or ES into a form such as electrical or optical signals, or radio waves that may be transmitted over the segment. An ES such as 50*b* will generally have one adapter for connecting to its single segment. A LAN IS such as 61 will have five adapters, one for each segment to which it is connected. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

Network ISs: Routers, Bridges, Repeaters

The LAN in FIG. 1 includes bridges 60-63. A bridge is understood in the art to be a type of computer optimized for very fast data communication between two or more segments. A bridge according to the prior art generally makes no changes to the data packets it receives on one segment before transmitting them on another segment.

A LAN may also contain a number of repeaters, which is one possible configuration of device 67. A repeater generally repeats out of each of its ports all data received on only one port, such that the network behavior perceived by ESs such as 50*a-c* is generally identical to the behavior they would perceive if they were connected on the same segment such as 52*d-g*.

Figure 2:
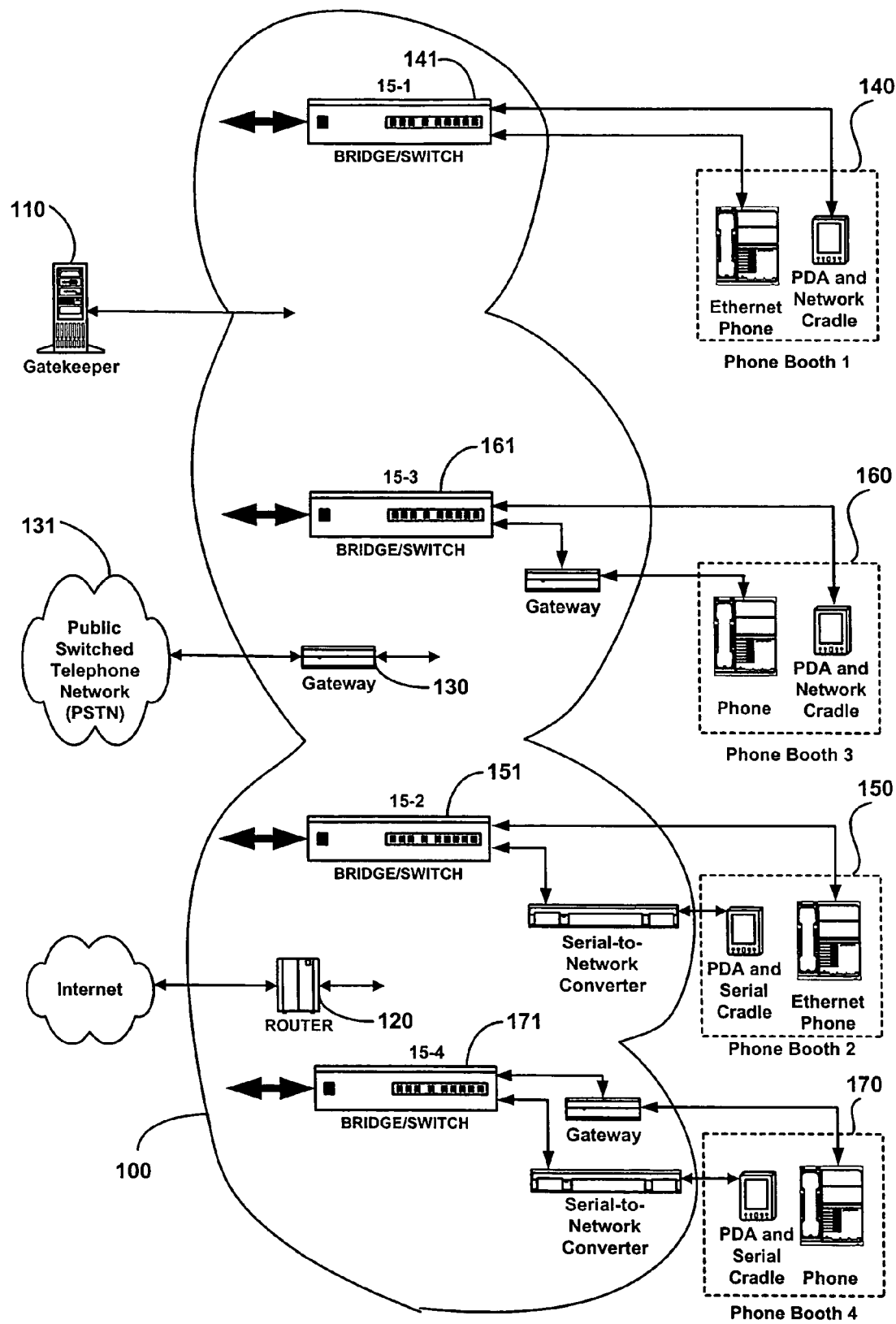
FIG. 2 is a generalized topology to illustrate one possible embodiment of this invention and is included for clarity of discussion. It will be apparent to those of skill in the art that this invention has applications with many different topologies and therefore should not be seen as limited by this topology.

It is intended that this invention be applicable in such instances as private businesses, educational institutions, government organizations as well as in configurations available to the general public. One possible embodiment of this invention is illustrated by the topology in FIG. 2. The LAN network (100) is a generalized representation as discussed previously within which are various hardware and software elements that operate together to allow a number of digital devices to exchange data within the LAN, and also to exchange data with external devices such as ESs, routers or WANs. Numerous different topologies within the LAN are appropriate for this invention and thus the segments between hardware elements within the LAN are omitted. One embodiment utilizes telephones connected to an Ethernet LAN. Other embodiments are realized by means of other 802 LANs.

A method and system are disclosed that will allow access to a LAN for the purpose of local communication within the LAN, for local and long distance telephone communication by connection to a Public Switched Telephone Network (PSTN), or for communication by connection to the Internet. System security is incorporated since user access to the LAN is granted only after a requesting user and any connected equipment are identified and authenticated. Once any request is authenticated and user access is allowed to the LAN, any disruption to the connection between that equipment and the LAN will be recognized by the LAN, and such equipment will immediately be denied access to the LAN. Furthermore, the present invention provides additional system security by incorporating a method to detect and immediately disconnect from previously authenticated equipment that exhibit any operational variation(s) unfamiliar to the LAN. An embodiment of this invention consists of a LAN, with a dedicated server called a Gatekeeper (110), a Router (120) to connect the LAN to the Internet, a gateway (130) used to connect the LAN to a Public Switched Telephone Network (PSTN) (131), and one or more telephone booths (PBs) (140, 150) each of which contain a telephone and a PDA cradle. The PDA cradle is the device used to connect the PDA to the LAN. Each PB connects to the LAN by means of a hub/switch (Bridge/Switch) (IS). PBs 140, 150, 160 and 170 are connected directly to IS-1 (141), IS-2 (151), IS-3 (161) and IS-4 (171) respectively.

Phone booths 140 and 150 each contain an Ethernet phone, which is identical to a regular telephone in appearance and basic functionality, but has a connector for Ethernet as opposed to an analog or digital phone line. Both Ethernet phones are connected directly to the LAN. Phone booth 140 also contains a PDA cradle that has an Ethernet interface, but phone booth 150 contains a serial cradle to accommodate a PDA having a serial interface such as RS-232. The cradle in phone both 140 is connected directly to the LAN, while the cradle in phone booth 150 connects directly to the LAN by means of the serial-to-network converter. It is also possible to use other non-Ethernet interface such as parallel or Universal Serial Bus (USB), or infrared.

Phone booth 160 contains a non-Ethernet telephone which is connected to Bridge/Switch IS-3 by means of a Voice Over IP Gateway, while the Ethernet cradle is connected directly to Bridge/Switch IS-3. Phone booth 170 also contains a non-Ethernet telephone which is connected to Bridge/Switch IS-4 by means of a Voice Over IP Gateway, and the serial cradle is connected to Bridge/Switch IS-4 by means of a Serial-to-Network Converter.

The PDAs store encrypted information about their owners, including the owner's name, their phone forwarding preferences, access permissions to the network, and charging/billing information. When a PDA is attached to a network cradle, this information is automatically transferred to the gatekeeper, which is a server that performs management tasks for the Ethernet phone network. These tasks include deciding whether or not a user is allowed to sign up and use a public Ethernet phone, maintaining billing and charging information, and forwarding incoming calls for a given user to the Ethernet phone at the user's current location. This invention provides a secure method for the PDA and the gatekeeper to exchange authentication information.

If the user in the phone booth does not have a PDA with the appropriate software, the system allows only toll-free calls, including calling card access numbers and emergency 911 calls. In order to make full use of the system, the user must have a PDA that fits in the cradle, and that has the phone management software. When the user drops his/her PDA in the network cradle and activates the phone management software, the network cradle receives the user's authentication and billing information from the PDA software and sends a message to the hub/switch to which it is connected. The hub/switch then communicates with the gatekeeper (110) to check the user's credentials, and if they are satisfactory, allows network connectivity for the network cradle and permits the phone to make toll calls. If the booth includes a serial cradle, then the serial cradle and serial-to-network converter performs the same function as the network cradle to exchange authentication information with the hub/switch.

Figure 3:
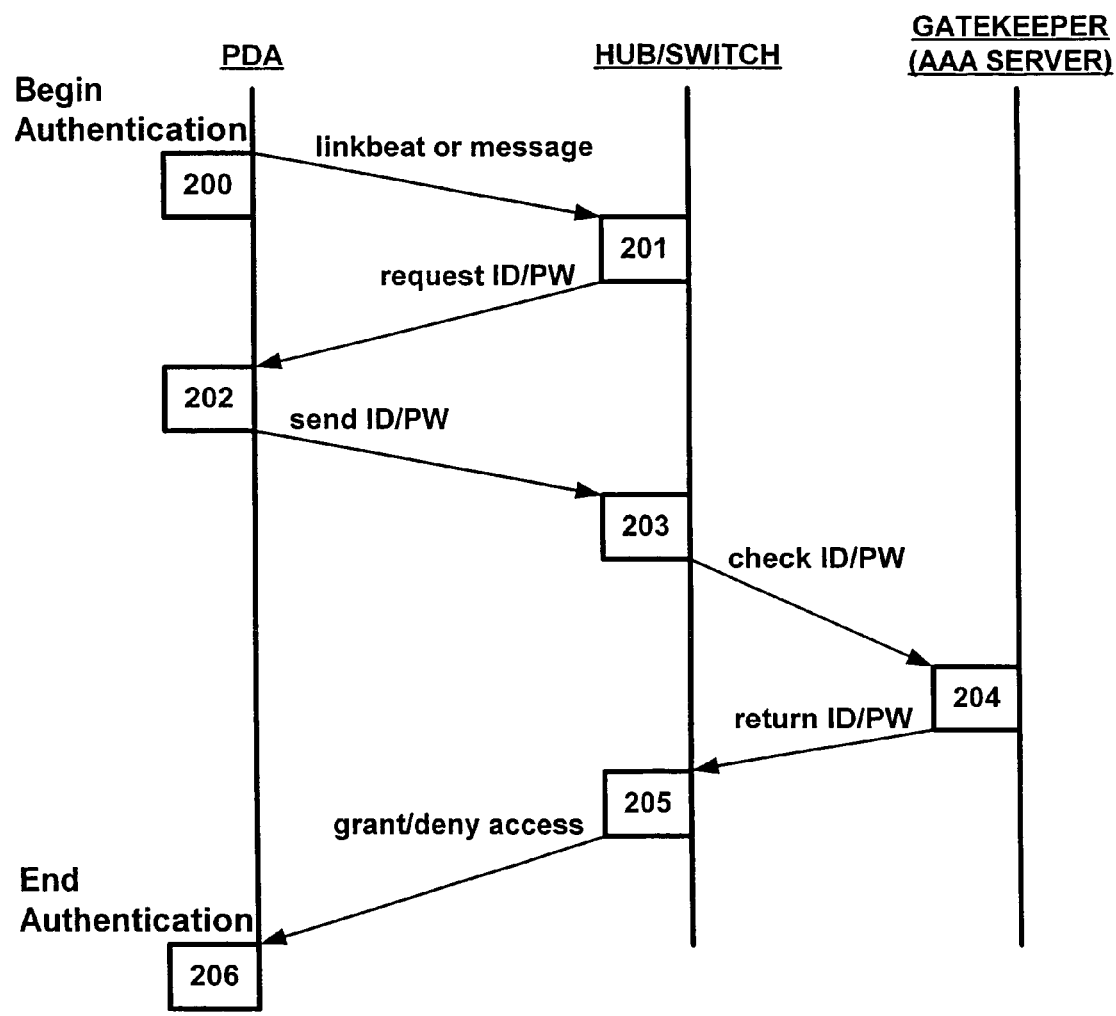
FIG. 3 is a state diagram illustrating steps of the authentication process in accordance with an embodiment of the present invention.

FIG. 3 provides a state diagram illustrating the authentication process in accordance with an embodiment of the present invention. Authentication is initiated by the hub/switch when it detects a connection on a port (detection of a linkbeat or observance of a message) (step 200). Alternatively, the network cradle, serial-to-network converter, or serial cradle indicates to the hub/switch to initiate authentication when a device is plugged in. This indication can be a physical signal (turning the linkbeat off momentarily) or a message to this effect. The hub/switch uses a backend AAA infrastructure through the gatekeeper to authenticate the connecting user as described in previously cited patent application Ser. No. 08/866,819, and Ser. No. 08/866,819. More specifically, the hub/switch will request certain user data such as user identification (ID) and password (PW) (step 201) from the PDA. At this point (step 202), the PDA provides information to the hub/switch.

The information supplied by the PDA is then forwarded by the hub/switch to the gatekeeper for user identification and authentication (step 203). The PDA includes a display screen for displaying status information regarding authentication. If the user is authenticated successfully (step 204) and the user has a dedicated link to the hub/switch port (via a network cradle for example) (step 200), the hub/switch port is opened (step 205) and a success message is sent to the network cradle (step 206). The network cradle now allows the user to make phone calls. If the switch port is shared (via a serial-to-network converter supporting multiple serial ports for example), a message is sent by the hub/switch to the cradle/converter to open up the corresponding serial port. If the user authentication fails (204), the hub/switch port is blocked (dedicated port) (205) or a failure message is sent to the cradle/converter (206) to block the corresponding serial port. A failure message is displayed to the user on the PDA (206).

The above process can be extended to share switch ports via network cradle as well (multiple network cradles connected to a switch port via a repeater). In this case, the authenticator (hub/switch) indicates to the authenticating network cradle to open/block the network port based on the results of authentication. The authenticator can also install filters to allow/disallow traffic from the corresponding MAC addresses.

Advantages of the present invention include portability of numbers. An authenticated user can simply drop the PDA into a cradle and begin making toll phone calls at the push of a button. A phone number stored in the PDA address book can be dialed automatically by the PDA. The graphical user interface on the PDA can display information such as callee's phone number and name, duration and cost of an ongoing call and a history of calls made. The phone booth can be extended into a virtual office since the PDA can communicate the user's phone number to the gatekeeper, and set up automatic call forwarding such that the calls made to the user's office number are forwarded to the Ethernet phone at the phone booth.

Furthermore, the PDA can be used to access the Internet, allowing applications such as World Wide Web and e-mail to be executed on the PDA. A user can be given the option to carry a voice conversation over the public Internet, thereby reducing the toll costs. Moreover, in this case, the long distance charges can be directly paid to the organization providing the toll booths, which may include places such as airport, restaurant or hotel installations. Such organizations are thereby offered an economic benefit.

The preferred embodiments of the invention, techniques for providing secure access to a communication system, are thus described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of providing secure access to a communication system comprising:
   receiving user data from an information appliance via an information appliance cradle associated with a telephone connected to a network, wherein the cradle and the telephone are separately connected to the network;
   authenticating the information appliance based on the user data;
   opening a port for use by the associated telephone to communicate voice data over the network provided the authentication is successful; and
   closing the port in response to detecting an operational variation associated with the information appliance that is unfamiliar to the network.

2. The method according to claim 1, wherein the user data comprises one or more data consisting of user identity, user billing information, phone forwarding preferences, accesses permissions to the network.

3. The method according to claim 2, wherein the user data is used to perform one or more management task consisting of deciding whether or not a user is allowed to sign up and use the telephone, maintaining billing information, and forwarding incoming calls for a given user to a given telephone at a user's current location.

4. The method according to claim 1, wherein the telephone communicates using an Ethernet protocol.

5. A compound network apparatus comprising:
   a telephone to communicate voice data; and
   a cradle, associated with the telephone, to receive a portable computer system;
   a server, communicatively coupled through a network to the telephone and separately to the cradle, to authenticate data received from the portable computer system, to open a port for use by the telephone provided the authentication is successful, and to close the port in response to detecting an operational variation, associated with the portable computer system, that is unfamiliar to the network.

6. The compound network apparatus of claim 5, wherein the telephone is a digital telephone.

7. The compound network apparatus of claim 5, wherein the telephone is an Ethernet phone.

8. The compound network apparatus of claim 7, wherein the Ethernet phone uses the port to communicate with the network.

9. The compound network apparatus of claim 5, wherein the cradle and communication device are located in proximity to each other.

10. The compound network apparatus of claim 5, wherein the portable computer system comprises a personal digital assistant.

11. The compound network apparatus of claim 5, wherein the network comprises one or more system consisting of a public network, a private network, a public telephone system, a private telephone system, a private local area network (LAN), a commercial LAN, and the internet.

12. The compound network apparatus of claim 5, further comprising a voice over internet protocol gateway coupled between the telephone and the network.

* * * * *